US012546092B2

(12) United States Patent
Jerauld et al.

(10) Patent No.: US 12,546,092 B2
(45) Date of Patent: Feb. 10, 2026

(54) DYNAMIC VIEWING SYSTEM ON A WORK MACHINE

(71) Applicant: Deere & Company, Moline, IL (US)

(72) Inventors: Alek D. Jerauld, Dubuque, IA (US); Keith J. Lensing, Asbury, IA (US); Samuel Schmitz, Dubuque, IA (US); Tianshuang Gao, Dubuque, IA (US); Giovanni A. Wuisan, Epworth, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/783,010

(22) Filed: Jul. 24, 2024

(65) Prior Publication Data

US 2026/0028802 A1 Jan. 29, 2026

(51) Int. Cl.

*H04N 23/698* (2023.01)
*E02F 3/32* (2006.01)
*E02F 9/26* (2006.01)

(52) U.S. Cl.

CPC ........... *E02F 9/261* (2013.01); *H04N 23/698* (2023.01); *E02F 3/32* (2013.01)

(58) Field of Classification Search

CPC ........... E02F 9/261; E02F 3/32; H04N 23/698
See application file for complete search history.

(56) References Cited

U.S. PATENT DOCUMENTS

| | | | | |
|---|---|---|---|---|
| 2019/0249391 | A1 * | 8/2019 | Kikuchi | E02F 3/845 |
| 2023/0035181 | A1 * | 2/2023 | Lee | E02F 9/24 |
| 2023/0332377 | A1 * | 10/2023 | Sato | E02F 9/245 |
| 2024/0151001 | A1 * | 5/2024 | Sonoda | E02F 9/0841 |

* cited by examiner

*Primary Examiner* — Thai Q Tran
*Assistant Examiner* — Jose M Mesa
(74) *Attorney, Agent, or Firm* — Christopher J. Volkmann; KELLY, HOLT & CHRISTENSON PLLC

(57) ABSTRACT

A work machine has an under carriage coupled to traction elements and an upper house that is rotatably coupled to the under carriage. A plurality of image sensors mounted to the upper house capture overlapping images around portions of a periphery of the work machine. An image processing system combines the images from the image sensors to generate a combined image around the periphery of the work machine. A dynamic display generation system identifies a portion of the combined display to display to an operator based on a swing angle identifying an angle by which the upper house is rotated relative to the under carriage, and based on a direction of travel of the work machine.

20 Claims, 19 Drawing Sheets

DYNAMIC VIEWING SYSTEM ON A WORK MACHINE

FIELD OF THE DESCRIPTION

The present description relates to the use of equipment in worksite operations. More specifically, the present description relates to dynamically generating a view using cameras on a work machine.

BACKGROUND

There is a wide variety of different types of equipment such as forestry equipment, construction equipment, among others. Some such equipment includes a lower carriage or frame that is attached to traction elements, such as wheels or tracks. An upper house is rotatable or pivotable relative to the lower carriage. An operator often operates such equipment from an operator compartment in the upper house. Some such equipment includes excavators, knuckle boom loaders, among others. The present description will proceed with respect to an excavator, but it will be appreciated that this is by way of example only and other equipment that includes an under carriage with traction elements and an upper house pivotable relative to the under carriage could be just as easily described.

While operating an excavator, for example, it is not uncommon that the upper house is swiveled or rotated by a certain angle (referred to herein as a swing angle) relative to the under carriage, while the traction elements are moving. Thus, for instance, the upper house, including the operator compartment, may be swiveled or rotated 90° relative to the under carriage, even while the tracks or other ground-engaging elements are propelling the excavator in a particular direction, or are turning the excavator, or are engaged to move the excavator over the ground in a different way.

The discussion above is merely provided for general background information and is not intended to be used as an aid in determining the scope of the claimed subject matter.

SUMMARY

A work machine has an under carriage coupled to traction elements and an upper house that is rotatably coupled to the under carriage. A plurality of image sensors mounted to the upper house capture overlapping images around portions of a periphery of the work machine. An image processing system combines the images from the image sensors to generate a combined image around the periphery of the work machine. A dynamic display generation system identifies a portion of the combined display to display to an operator based on a swing angle identifying an angle by which the upper house is rotated relative to the under carriage, and based on a direction of travel of the work machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
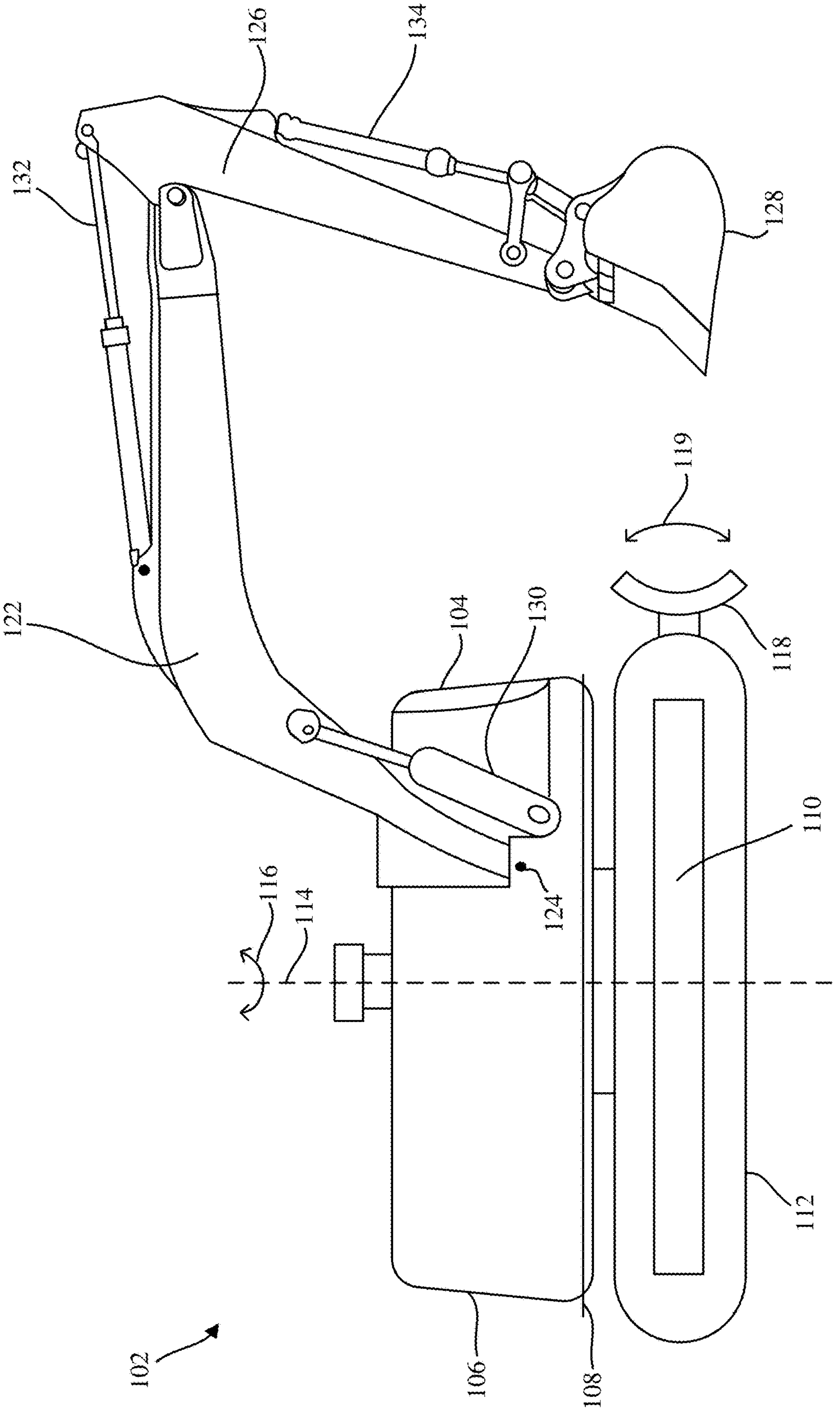
FIG. 1 is a side view of one example of a work machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

As discussed above, excavators, knuckle boom loaders and other equipment often have a lower frame (or under carriage) which is mounted to ground-engaging elements (such as tracks) that provide propulsion to the machine and an upper house that is rotatable relative to the lower frame (or under carriage). While the resent description will proceed with respect to an excavator, it will be appreciated that the present description could also proceed with respect to other equipment that has an upper house rotatable relative to a lower frame where the lower frame supports the traction elements or ground-engaging elements that provide propulsion to the machine.

An excavator has digging equipment, such as a boom, arm, and bucket or other attachment coupled to the house. Therefore, it is not uncommon for an excavator to be tracking (or moving) in one direction while the house is rotated relative to the under carriage by a swing angle, making it difficult for an operator to see in the direction that the machine is moving. For example, assume that the under carriage is supported by tracks and that the upper house is at a reference position (non-rotated position) relative to the under carriage when the front of the upper house is aligned with the tracks so the front of the house is moving forward when the tracks are moving forward. Assume further that the upper house is now rotated 90° relative to the reference position with respect to the under carriage, and that the machine is moving in a direction (e.g., to the right) where visibility is limited to the operator. This can make it difficult for the operator to accurately perform an operation given the limited visibility.

The present description thus proceeds with respect to a work machine that has a dynamic image processing system and a set of cameras or other image capture elements disposed on the upper house. The cameras or other image capture devices (hereinafter referred to as cameras) capture images about the periphery of the house. The dynamic image processing system combines the images (such as by stitching) to generate a combined view (e.g., a bird's eye view) about the periphery of the excavator. A dynamic display generation system senses the swing angle of the house relative to the under carriage (relative to the reference position) and also detects the travel direction of the machine and identifies a portion of the combined view that is to be displayed to the operator. In one example, the portion of the display that is shown to the operator includes a display of the periphery of the excavator in the direction of travel, and oriented in a pre-defined orientation relative to a front of the house. If the swing angle of the house relative to the under carriage changes, the view displayed to the operator remains the same, preferentially showing a periphery of the excavator in the direction of travel, and oriented in the pre-defined orientation relative to the front of the house. If the direction of travel changes, then the dynamic display generation system generates a different display, showing the periphery of the machine again in the direction of travel and oriented in the pre-defined orientation relative to the front of the house.

FIG. 1 is a side view of one example of a work machine 102. Work machine 102 includes an operator compartment 104 which is mounted on an upper house 106. House 106 is supported by an upper frame 108 and rotatably coupled to a lower frame or under carriage 110 which supports one or more ground-engaging traction elements 112 (in the example shown in FIG. 1, the traction elements are tracks, but the traction elements could be wheels or other traction elements). House 106 is driven by an actuator to rotate relative to under carriage 110 about axis 114, as indicated arrow 116. FIG. 1 also shows that, in one example, the under carriage 110 supports a blade 118 which can be raised or lowered in the direction indicated by arrow 119 relative to the under carriage 110.

FIG. 1 also shows that, in one example, a boom 122 is coupled to the frame 108 that supports house 106. Boom 122 rotates about a boom axis 124. Stick or arm 126 is rotatably coupled to boom 122. An attachment 128 (illustrated as a bucket) is attached to a distal end of stick 126. Movement of boom 122 relative to frame 108 can be driven by one or more actuators 130, which can be hydraulic actuators or other actuators. Movement of arm or stick 126 relative to boom 122 can also be driven by one or more actuators 132, and movement of attachment 128 relative to stick or arm 126 can be driven by one or more actuators 134. While a single track 112 is illustrated in FIG. 1, it will be appreciated that work machine 102 may have a plurality of tracks that are arranged in parallel relative to one another and mounted to under carriage 110 to provide movement of work machine 102 over the ground or other surface on which work machine 102 is operating.

Figure 2:
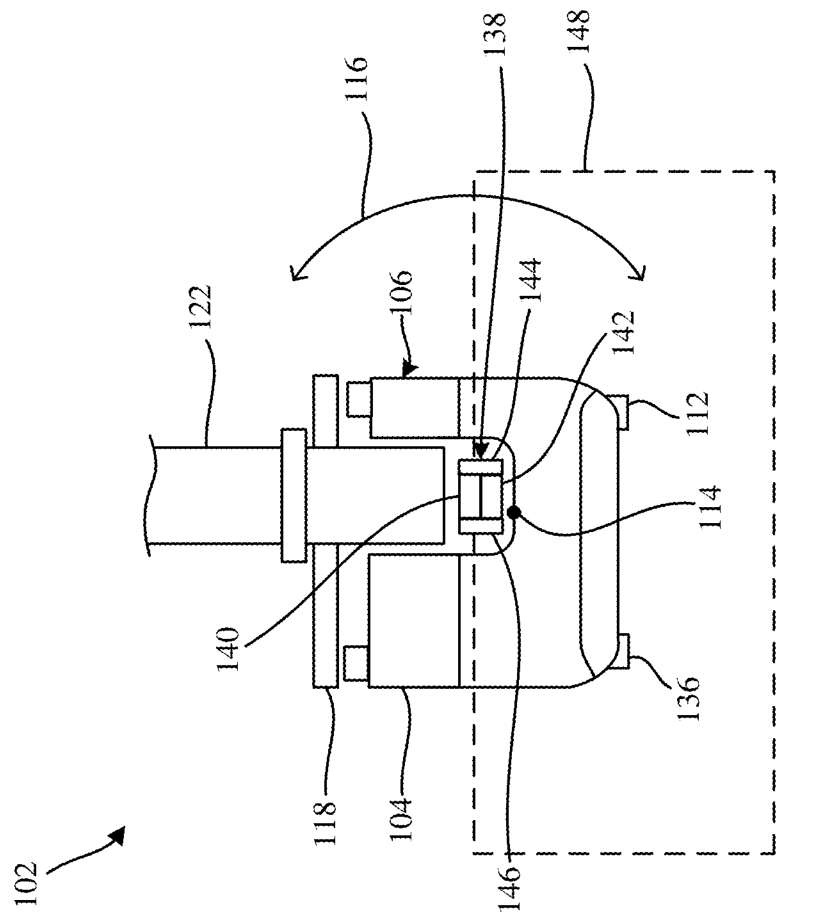
FIG. 2 is a top view of a work machine showing one example of an image captured by an image capture device.

FIG. 2 is a top view of work machine 102, and similar items are similarly numbered to those shown in FIG. 1. FIG. 2 also shows that work machine 102 includes a second track 136 that is generally parallel to track 112 and coupled to under carriage 110. In one example, tracks and 136 are independently controllable to control the heading and travel direction of the under carriage 110 of machine 102. FIG. 2 also shows that work machine 102 can have a plurality of image capture devices (such as cameras) 138 mounted for movement with house 106. The cameras may include a forward-looking camera 140, a rearward-looking camera 142, and opposite side facing cameras 144 and 146. It will be appreciated, however, that a different number of cameras can be used and the cameras can be arranged or configured in different ways, other than those shown in FIG. 2.

FIG. 2 also shows that camera 142 has a generally rearward facing (relative to house 106) field of view indicated by dashed line 148. Therefore, an image captured by camera 142 may be an image of the field of view 148. FIG. 2 also shows house 106 in a pre-defined reference position relative to the under carriage 110. In the pre-defined reference position (in one example), the front of house 106 faces in the direction of travel when tracks 112, 136 are moving at equal speeds in the forward direction.

Figure 3:
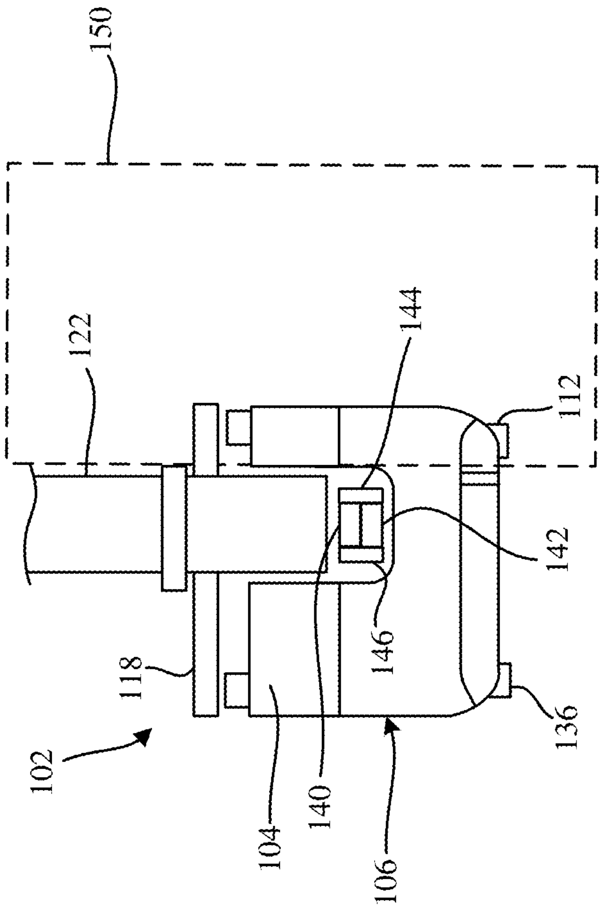
FIG. 3 is a top view of a work machine showing another example of an image captured by an image capture device.

FIG. 3 is similar to FIG. 2, and similar items are similarly numbered. However, FIG. 3 shows that camera 144 takes images of a rightward facing field of view 150.

Figure 4:
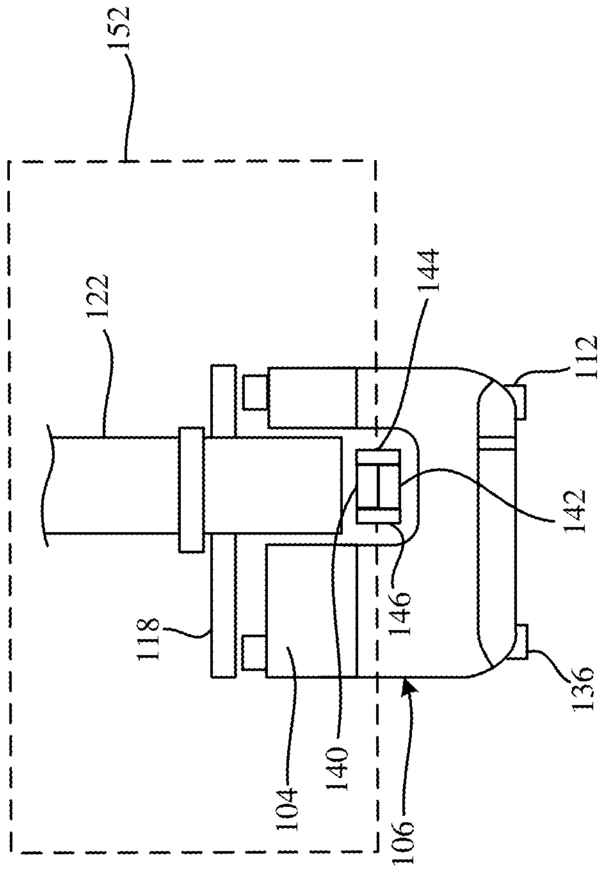
FIG. 4 is a top view of a work machine showing another example of an image captured by an image capture device.

FIG. 4 is similar to FIG. 3, and similar items are similarly numbered. However, FIG. 4 shows that camera 140 takes pictures of a field of view 152 generally forward of house 106.

Figure 5:
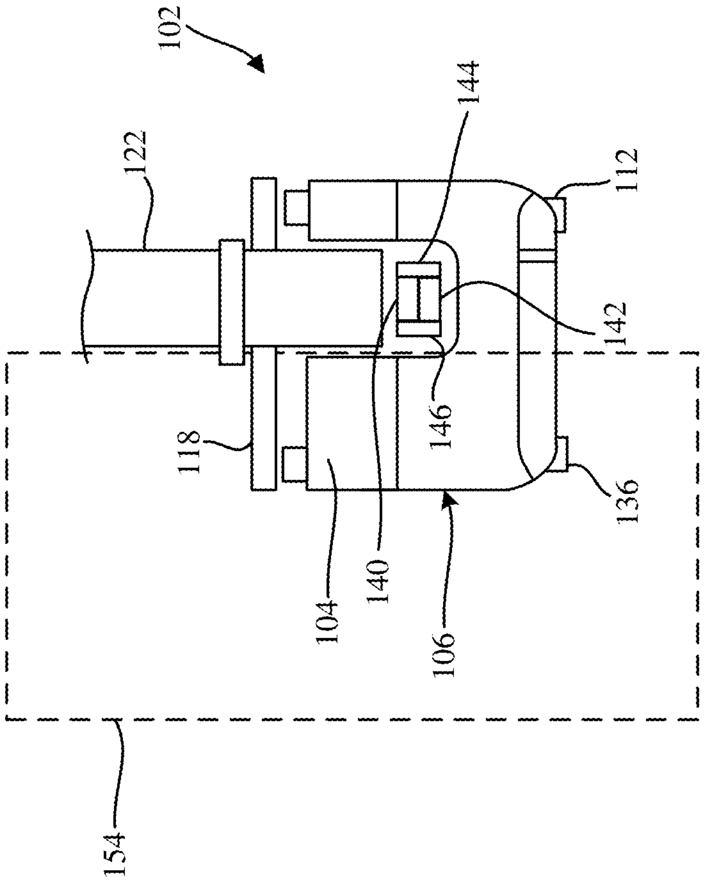
FIG. 5 is a top view of a work machine showing another example of an image captured by an image capture device.

FIG. 5 is similar to FIG. 4, and similar items are similarly numbered. However, FIG. 5 shows that camera 146 takes an image of a field of view 154 generally to the left side of house 106, opposite field of view 150 shown in FIG. 3. Because cameras 140, 142, 144, 146 move with house 106, the fields of view will be the same relative to house 106 as house 106 pivots relative to under carriage 110, but the fields of view will rotate relative to under carriage 110 as house 106 pivots.

Figure 6:
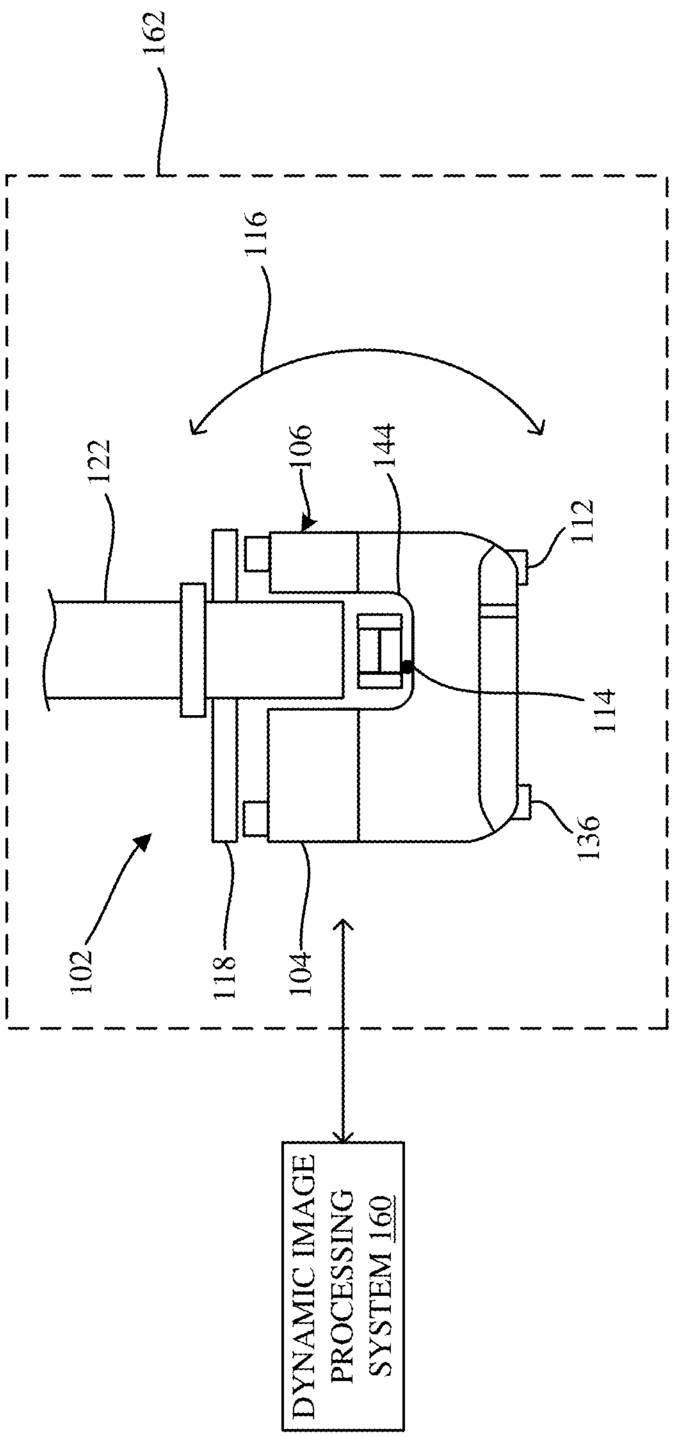
FIG. 6 is a top view of a work machine showing one example of a combined image.

FIG. 6 is a similar to FIG. 5, and similar items are similarly numbered. However, FIG. 6 also includes a dynamic image processing system 160. Dynamic image processing system receives the images of the different fields of view 148, 150, 152, and 154 and combines them, or stitches them together, to generate an overall view 162, such as a bird's eye view, showing the area about the entire periphery of work machine 102. Dynamic image processing system 160 is described in greater detail below, and can be located on machine 102, at a remote server environment (such as in the cloud), on a different work machine or in a different computing system. Dynamic image processing system 160 can also be distributed among a variety of different locations, such as partially on work machine 102 and partially in the cloud, or distributed in other ways. The combined image 162 can be displayed on a display device in operator compartment 104. The display device may be an integrated display device mounted in operating compartment 104, or a mobile device, or another device, such as a device carried by the operator, or otherwise.

Also, it can be seen that if work machine 102 is being driven in various directions, it may be difficult for the operator in operator compartment 104 to see in that direction. Similarly, as house 106 is rotated in the direction indicated by arrow 116 relative to the under carriage 110 that supports traction elements 112 and 136, this can make it even more difficult for the operator to see, particularly when the traction elements 112 and 136 are engaged so that work machine 102 is moving in a particular direction, is turning, etc. Therefore, in one example, dynamic image processing system 160 detects when the work machine 102 is being driven and the direction of travel (e.g., by detecting actuation of one or more of the traction elements 112, 136 or in other ways) and also detects the swing angle of house 106 about pivot axis 114. Using the swing angle and the direction of travel, dynamic image processing system 160 generates an image that can be displayed in operator compartment 104 that shows an area about the periphery of work machine in the direction of travel, oriented relative to a particular portion of work machine 102 (such as oriented relative to the front of house 106 in a pre-defined orientation). In one example, the pre-defined orientation is such that, in the displayed view, the front of house 106 will always face upward. However, this is just one example of such a pre-defined orientation.

Figure 7:
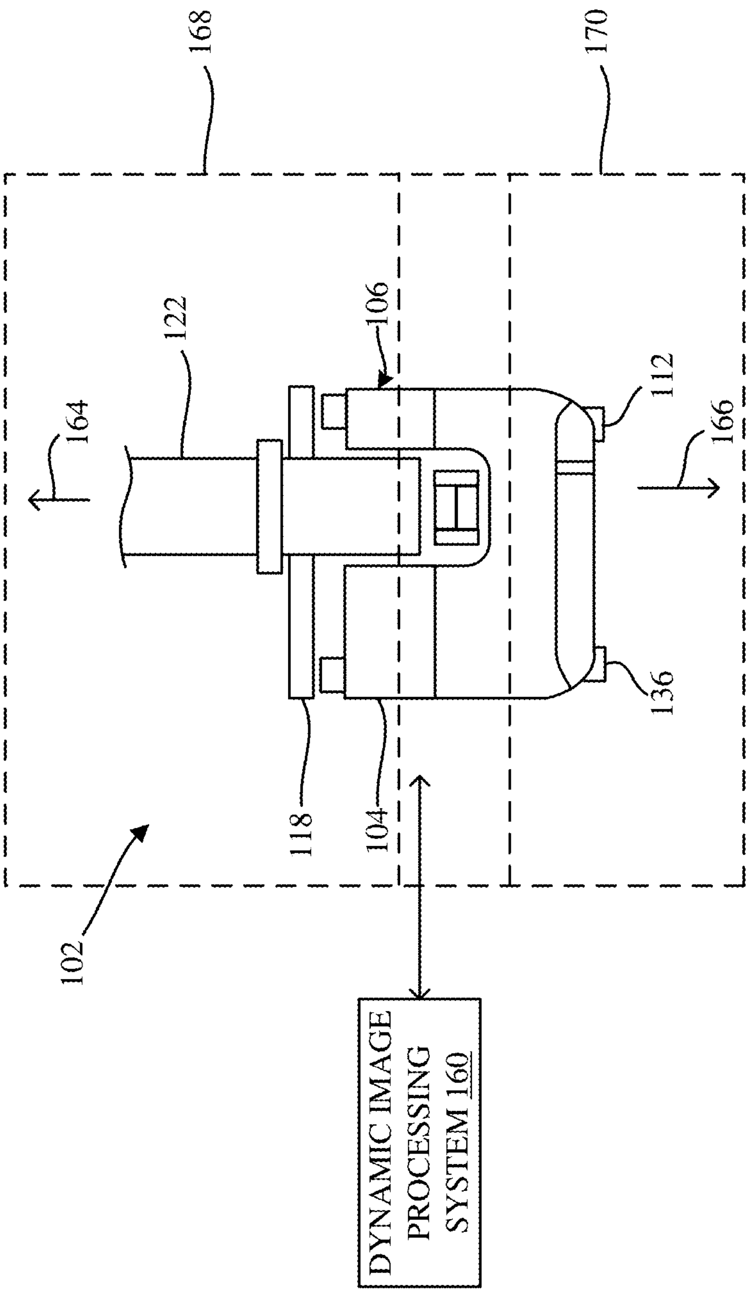
FIG. 7 is a top view of a work machine showing examples of a portion of the combined image that can be displayed when the work machine is moving in a forward direction or a rearward direction and when the upper house is not offset from a reference position relative to the under carriage.

FIG. 7 is similar to FIG. 6, and similar items are similarly numbered. However, in FIG. 7, it is assumed that work machine 102 is traveling either in the forward direction indicated by arrow 164 or in the rearward direction indicated by arrow 166. When work machine 102 is being driven in the forward direction indicated by arrow 164, dynamic image processing system 160 detects that work machine 102 is being driven in the direction 164 and also detects the swing angle of house 106 relative to the under carriage 110. In FIG. 7, the swing angle is zero in that house 106 is not pivoted from the reference position relative to the under carriage 110. In that case, dynamic image processing system 160 determines which part of the combined view 162 (in FIG. 6) should be shown to the operator and generates a display with a field of view 168 to preferentially show an area about the periphery of machine 102 generally in the front of machine 102 (in the direction of travel 164). The display is displayed to the operator in operator compartment 104.

When work machine 102 is being driven by traction elements 112 and 136 in the rearward direction indicated by arrow 166, then dynamic image processing system 160 again detects the direction of travel 166 and the swing angle and dynamically determines which part of combined view 162 should be displayed and generates a display showing the field of view 170 which preferentially shows an aera generally about the periphery of the house 106 in the rearward direction (in the direction of travel).

Figure 8:
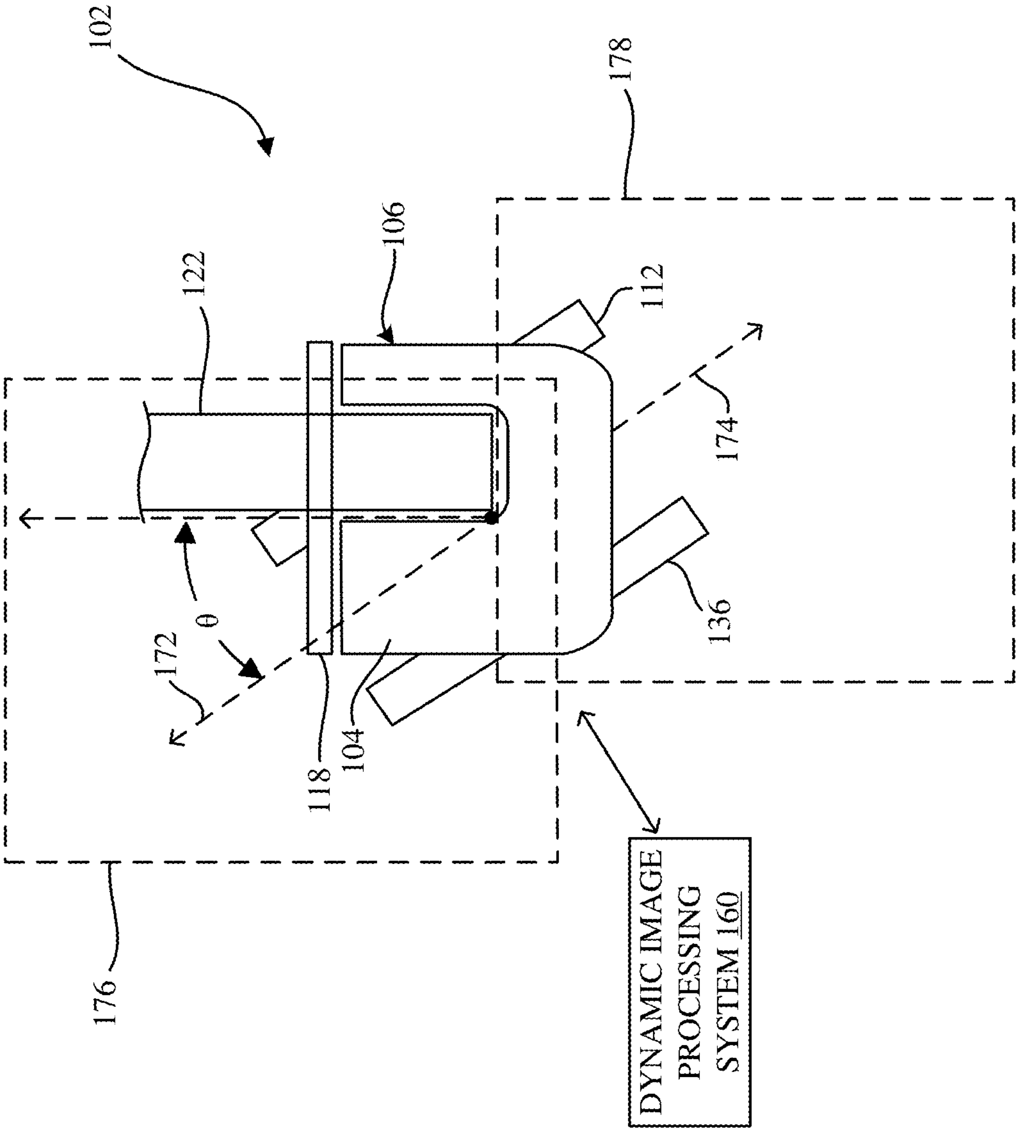
FIG. 8 is a top view of a work machine in which displays are illustrated for an example in which the upper house is offset by a swing angle θ from a reference position relative to the under carriage and in which the work machine is moving.

FIG. 8 is similar to FIG. 7, and similar items are similarly numbered. However, it can be seen in FIG. 8 that the upper house 106 is rotated relative to the reference position with respect to the lower carriage 110 by an angle θ. When rotated, it may be that traction elements 112, 136 are actuated to begin moving work machine 102 in the direction indicated by one of arrows or 174. When moving in the direction indicated by arrow 172, dynamic image processing system 160 detects the direction of travel (e.g., based upon the control signals controlling actuation of traction elements 112 and 136 or in other ways) and also detects the swing angle θ and generates an image that preferentially shows the periphery of work machine 102 in the direction of travel, and in a pre-defined orientation relative to the front of house 106. Therefore, when work machine 102 is tracking or traveling in the direction indicated by arrow 172, that direction is detected by dynamic image processing system 116, and also, system 116 detects the swing angle θ. Dynamic image processing system 160 then identifies a portion of the combined view 162 that is to be displayed to the user in operator compartment 104 such that the portion 176 of the display preferentially shows an area about the periphery of machine 102 in the direction of travel 172, and so that the display portion 176 is also oriented with respect to the front of house 106 on machine in a pre-defined orientation. Therefore, when display portion 176 is displayed, the display will show that the front of house 106 will be pointed in the same direction (e.g., in the upward direction) in display 176 regardless of the swing angle θ.

Similarly, when machine 102 is traveling in the direction indicated by arrow 174, then the direction of travel 174 and the swing angle θ will both be detected by dynamic image processing system 160 to identify the display portion 178 of the combined image 162 that is to be displayed to the operator in operator compartment 104. In the example shown in FIG. 8, the display portion 178 will preferentially show an area about the periphery of house 106 in the direction of travel 174, and will also be oriented relative to the front of house 106 so that the front of house 106 is pointed upward in the display portion 178 while the rear portion of house 106 is pointed downwardly in display portion 178. Therefore, regardless of which display portion 176 or 178 is displayed, the orientation of house 106 is the same in both display portions 176 and 178. However, the area shown in each display portion changes to preferentially show an area in the direction of travel (e.g., by preferentially, it is meant in one example that more of the display area is about the periphery of house 106 in the direction of travel than in other directions).

Figure 9:
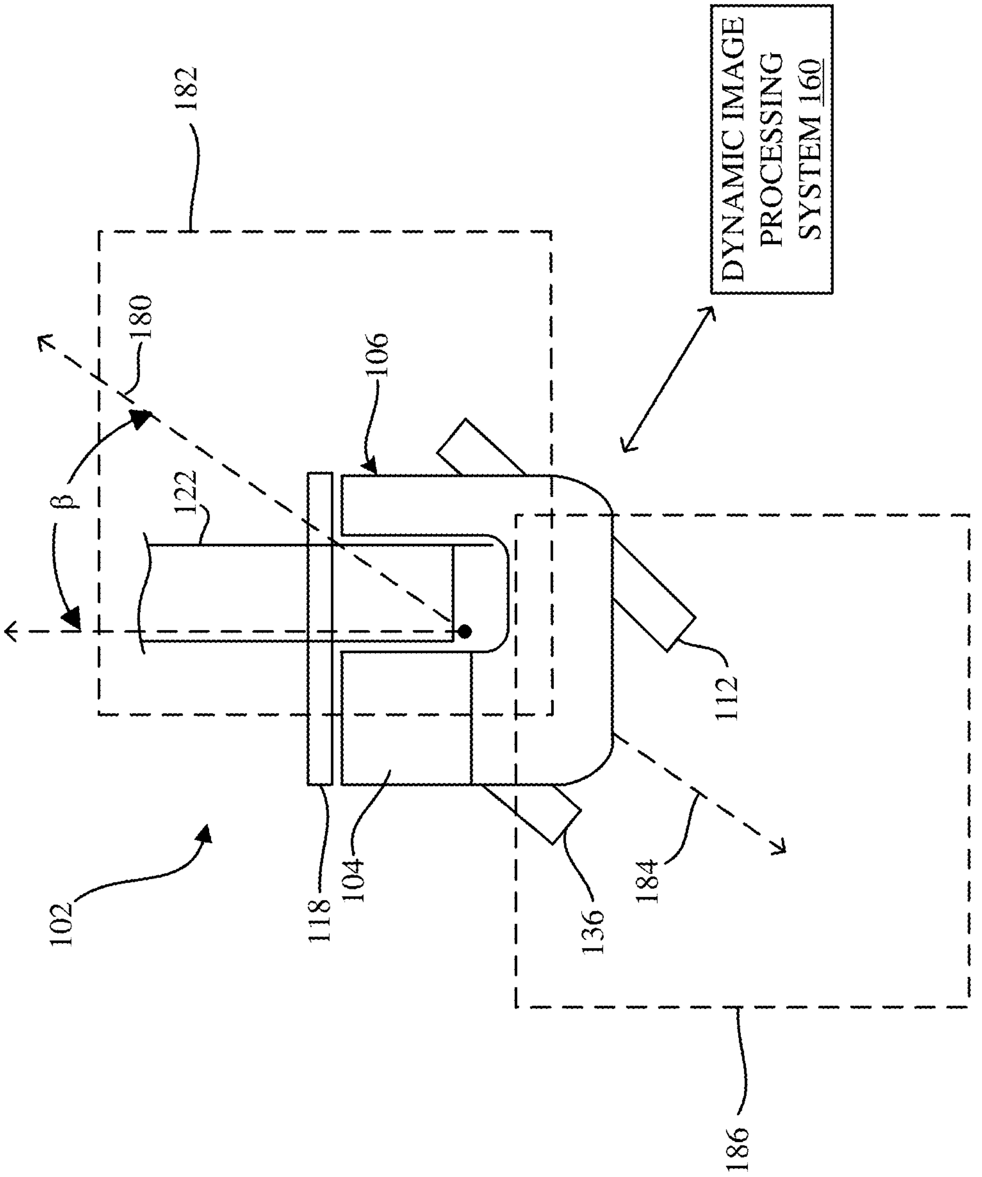
FIG. 9 is a top view of a work machine in which displays are illustrated for an example in which the upper house is offset by a swing angle 3 from the reference position relative to the under carriage and in which the work machine is moving.

FIG. 9 is similar to FIG. 8, and similar items are similarly numbered. However, in FIG. 9 the upper house 106 is rotated in the opposite direction by an angle 3 relative to the under carriage 110. Therefore, dynamic image processing system 160 detects this swing angle as well as the direction of travel of work machine 102 (such as by detecting actuation of tracks 112, 136) and generates a display portion about the periphery of work machine 102, in the direction of travel of work machine 102, and orienting work machine 102 according to the pre-defined orientation (e.g., with the front of house 106 pointed upwardly in the display and the rear of house 106 pointed downwardly in the display). Therefore, as shown in FIG. 9, if work machine 102 is traveling in the direction indicated by arrow 180, then dynamic image processing system 160 generates a display portion 182, which is a portion of the combined image 162 shown in FIG. 6, but which shows an area about the periphery of house 106 preferentially in the direction of travel 180. Similarly, if work machine 102 is traveling in the direction indicated by arrow 184, then dynamic image processing system 160 generates a display portion 186 that shows an area about the periphery of house 106, preferentially in the direction of travel 184. Also, as can be seen in FIG. 9, in both display portions 182 and 186, the house 106 is oriented the same (e.g., according to the pre-defined orientation).

Figure 10:
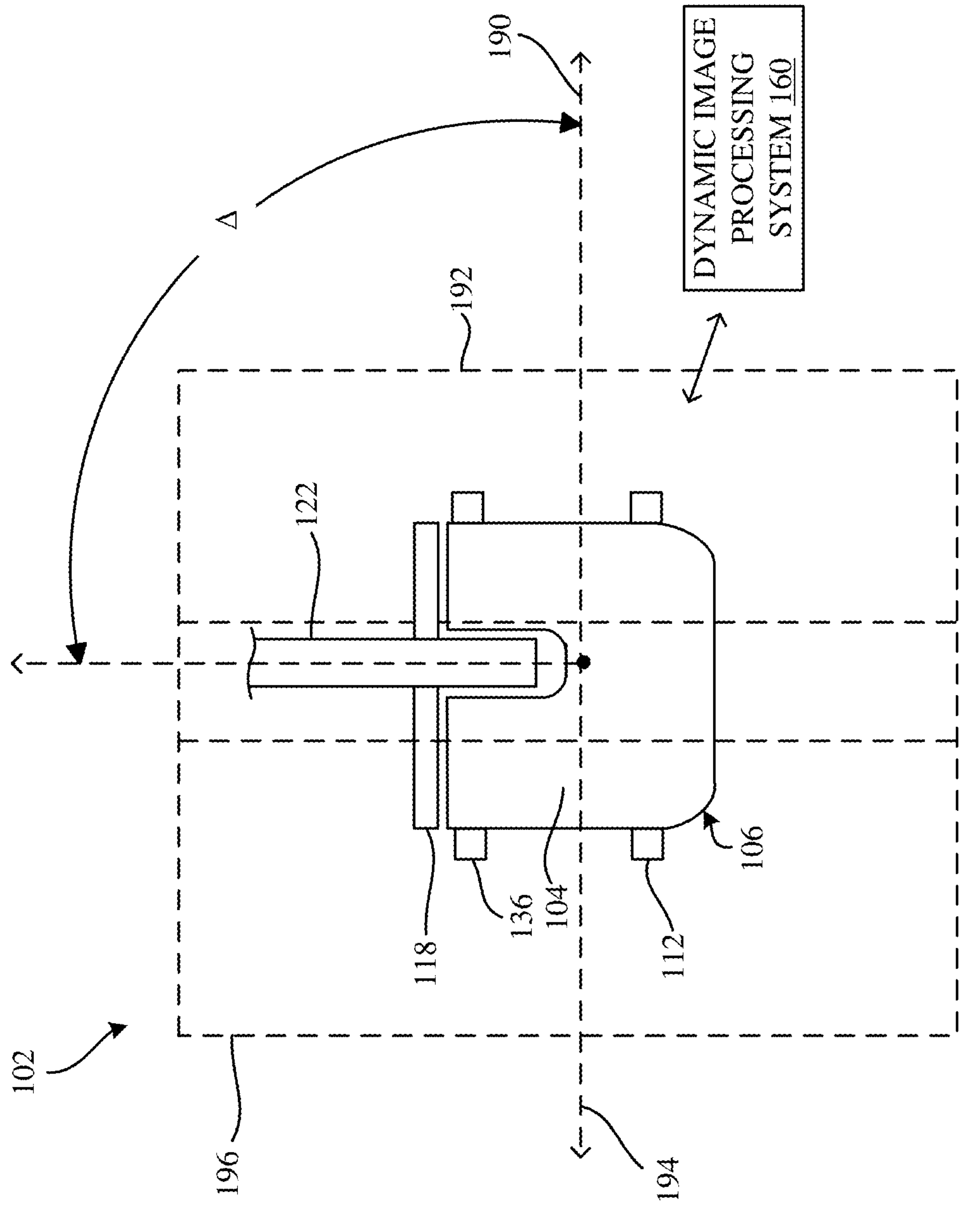
FIG. 10 is a top view of a work machine in which displays are illustrated for an example in which the upper house is offset by a swing angle A from the reference position relative to the under carriage and in which the work machine is moving.

FIG. 10 is similar to FIG. 9, and similar items are similarly numbered. However, in FIG. 10 it can be seen that house 106 is rotated relative to the under carriage 110 by an angle A that is approximately 90°. Dynamic image processing system 160 thus detects the swing angle A (which may be indicated by the actuation of tracks 112, 136). Therefore, for example, when work machine 102 is traveling in the direction indicated by arrow 190, dynamic image processing system generates a display portion 192 of combined image 162 which preferentially displays an area about the periphery of house 106 in the direction of travel, while maintaining the orientation of house 106 in the display portion 192 as discussed above with respect to the other display portions. Similarly, when work machine 102 is traveling in the direction indicated by arrow 194, then dynamic image processing system 160 generates a display portion 196 which shows an area preferentially about the periphery of house 106 in the direction of travel. Similarly, display portion 196 is also generated so that the house 106 is oriented the same as in other display portions. Thus, the front of house 106 points upwardly in display portion 196 and the rear of house 106 is oriented downwardly, for example.

Therefore, no matter which direction work machine is traveling, and no matter what the swing angle, dynamic image processing system 160 generates a display portion that can be displayed to the operator in operator compartment 104 which displays an area ahead of the work machine 102 in the direction of travel, while consistently orienting house 106 within that display portion. Even if house 106 is swinging, and/or even if tracks 112, 136 are being actuated to change the heading of work machine 102 (e.g., to turn work machine 102), dynamic image processing system 160 generates a display portion that will consistently orient house 106 in that display portion and will consistently and preferentially show an area about the periphery of house 106 in the direction of travel. In one example, by preferentially showing an area about the periphery of house 106 in the direction of travel, it is meant that the display portion shows more area about the periphery of house 106 in the direction of travel than the area displayed about the periphery of house 106 in other directions.

Figure 11:
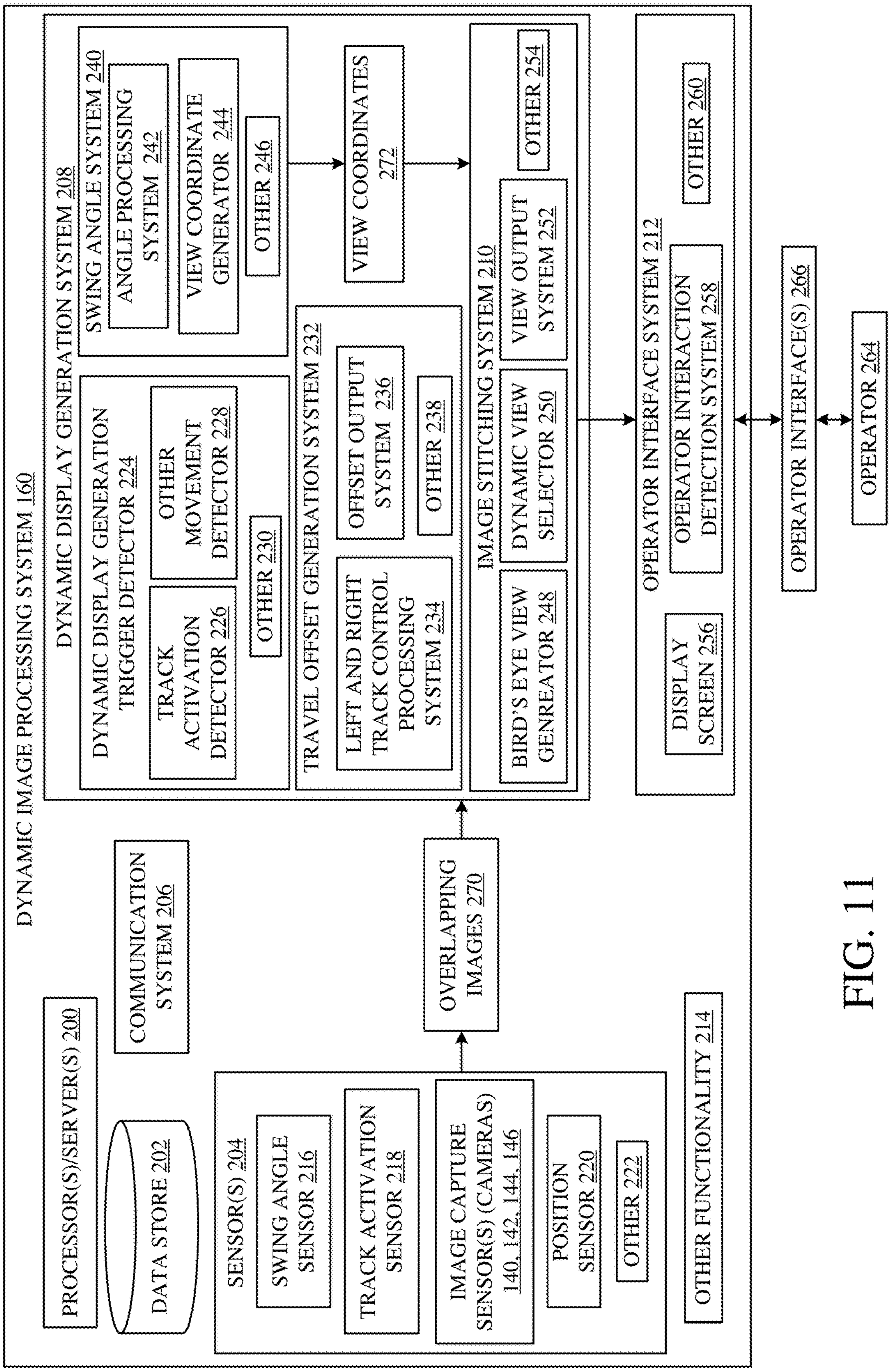
FIG. 11 is a block diagram of one example of a dynamic image processing system, in more detail.

FIG. 11 is a block diagram showing one example of dynamic image processing system 160 in more detail. FIG. 11 shows that dynamic image processing system 160 may include one or more processors or servers 200, data store 202, sensors 204, communication system 206, dynamic display generation system 208, image stitching system 210, user interface system 212, and other functionality 214. Sensors 204 can include swing angle sensor 216, track activation senor 218, image capture sensors (e.g., cameras) 140, 142, 144, 146, position sensor 220, and other sensors 222. Dynamic display generation system 208 can include dynamic display generation trigger detector 224 (which, itself, can include track activation detector 226, other movement detector 228, or other items 230), travel offset generation system 232 (which, itself, can include left and right track control processing system 234, offset output system 236, and other items 238), and swing angle system 240 (which, itself, can include angle processing system 242, view coordinate generator 244, and other items 246). Image stitching system 210 can include bird's eye view generator 248, dynamic view selector 250, view output system 252, and other items 254. Operator interface system 212 can include display screen 256, operator interaction detection system 258, and other operator interface mechanisms and processing systems that can generate outputs to an operator 264 and receive inputs from operator 264.

Operator interface system 212 can generate one or more operator interfaces 266 (such as displays on display screen 256). The operator interfaces 266 may themselves be actuatable by operator 264. For instance, operator interfaces 266 can be displayed on a touch sensitive display screen in which case operator interaction detection system 258 detects operator interactions or touch gestures on the display screen. Operator interfaces 266 may display icons, buttons, links, or other operator actuatable input mechanisms as well. Before describing the overall operation of dynamic image processing system 160, a description of some of the items in dynamic image processing system 160, and their operation, will first be provided.

Swing angle sensor 216 may be a rotary sensor or another sensor (such as a potentiometer or an angle encoder or other rotary sensor), a Hall Effect sensor, or another sensor that senses the swing angle of house 106 relative to under carriage 110. Swing angle sensors 216 generates an output signal indicative of the swing angle.

Track activation sensor 218 can be a sensor on an operator input mechanism that activates one or more of the traction elements (e.g., tracks 112, 136) or a sensor on the motors, transmissions or axles connected to tracks 112, 136, or another sensor indicative of the direction and speed of the tracks 112, 136 or other traction elements. Image capture sensors (e.g., cameras) 140, 142, 144, and 146 may be arranged as discussed above with respect to FIGS. 1-10 or in other ways, and capture images (e.g., overlapping images) from which a combined image can be generated that shows the area about the periphery of house 106. Position sensor 220 can be a global navigation satellite system (GNSS) receiver, a cellular triangulation sensor, a dead reckoning system, or any of a wide variety of other sensors that provide an output indicative of a location of sensor 220 in a global or local coordinate system.

Communication system 206 facilitates the communication of items in dynamic image processing system 160 with one another. Therefore, communication system 206 can be a controller area network (CAN) bus and bus controller, or another communication system. Similarly, communication system 206 may be configured to communicate with other machines, or other systems. Therefore, communication system 206 may be a cellular communication system, a local area network communication system, a wide area network communication system, a Bluetooth or Wi-Fi or near field communication system, or any of a wide variety of other communication systems or combinations of systems.

Dynamic display generation system 208 receives a set of overlapping images 270 from image capture sensors 140 142, 144, and 146 and generates a combined image which, in one example, is a bird's eye view of the machine 102 and the periphery around house 106. Then, when any of the traction elements (e.g., tracks 112, 136) are activated, dynamic display generation system 208 detects the swing angle and the direction of travel of machine 102 and generates a display as a portion of the combined image, which preferentially shows an area about the forward periphery of machine 102 in the direction of travel. The display portion is also oriented consistently with respect to house 106, regardless of the swing angle and regardless of the direction of travel. That display portion is provided to operator interface system 212 where display screen 256 displays the display portion on one or more of operator interfaces 256 for operator 264. In one example, the display may be interactive (such as being displayed on a touch sensitive display screen or displayed with operator actuatable elements such as icons, links, buttons, etc.) so that operator 264 can interact with the operator interface 266 to change the view being displayed, or otherwise. Operator interaction detection system 258 detects any operator interactions and provides an indication of those interactions to dynamic display generation system 208 for processing.

In generating the display portion for display on display screen 256, dynamic display generation trigger detector 224 detects a trigger indicating that the dynamic display portion should be generated. The trigger detector 224 may detect any of a wide variety of different trigger criteria. For instance, track activation detector 226 may receive an input from track activation sensor 218 indicating that one or more of the traction elements (e.g., tracks 112, 136) have been activated. This means that machine 102 is moving over the ground or terrain or other surface. Movement of machine 102 may be a trigger criterion indicating that the dynamic display portion should be generated. Other movement detector 228 may detect movement of machine 102 in other ways. For instance, other movement detector 228 may receive a plurality of inputs from position sensor 220 and determine that the position of machine 102 has changed and may thus detect machine movement in that way, to trigger generation of the dynamic display portion.

Once triggered, travel offset generation system 232 identifies an offset corresponding to the direction of travel of machine 102, where the offset will be used in identifying which portion of the combined image 162 will be used as the dynamic display portion. Left and right track control processing system 234 receives the activation signals indicative of the activation of the left and right tracks 136, 112 and processes those signals to determine the direction of travel. The direction of travel can then be used to identify an offset in the combined image 162 that can be used to generate the dynamic display portion (the display of the area about the periphery of house 106 in the direction of travel). Offset output system 236 generates an output indicative of that offset. Swing angle system 240 identifies the swing angle of house 106 relative to under carriage 110 with respect to a reference position and uses that swing angle to also identify the dynamic display portion. Angle processing system 242 receives an input from swing angle sensor 216 indicative of the swing angle of house 106 relative to under carriage 110. The swing angle is used by angle processing system 242 in conjunction with the travel offset output by offset output system 236 to identify coordinates in a local coordinate system corresponding to the particular portion of combined image 162 that is to be used as the dynamic display portion that is displayed to the operator 264. The coordinates, referred to as view coordinates 272, are output to image stitching system 210 for generation of the dynamic display portion.

Bird's eye view generator 248 receives the overlapping images 270 and generates the combined image 162 that shows the entire periphery of house 106, in one example, as a bird's eye view. Dynamic view selector 250 receives the view coordinates 272, and selects a portion of the bird's eye view that is to be used as the dynamic display portion which displays the area about the periphery of house 106 in the direction of travel of machine 102. View output system 252 outputs the dynamic view selected by dynamic view selector 250 to operator interface system 212 for display on display screen 256.

At this point, an example may be helpful. It is assumed for the sake of the present example that the traction elements are tracks 112 and 136. The dynamic display portion can be a portion of the combined view 162, the portion being defined by coordinates in the combined view 162. Assume, for example, that in a local coordinate system, the coordinates (0,0) represent the center of the bird's eye view or combined image 162. Changing the y coordinate will show more of the top view (e.g., the forward-looking view 168 in FIG. 7) as the y coordinate moves more positive, and changing the x coordinate will show more of the right-hand side of the bird's eye view (e.g., more of view 192 in FIG. 7) as the x coordinate moves more positive. Thus, a set of coordinates (0,1) would show the forward-looking view 168 illustrated in FIG. 7 and a set of coordinates (0,−1) would correspond to the rearward-looking view 170 illustrated in FIG. 7. Similarly, a set of coordinates (−1,0) would correspond to the leftward-looking display portion 196 illustrated in FIG. 10, and a set of coordinates (1,0) would correspond to the rightward-looking display portion 192 illustrated in FIG. 10.

Figure 13:
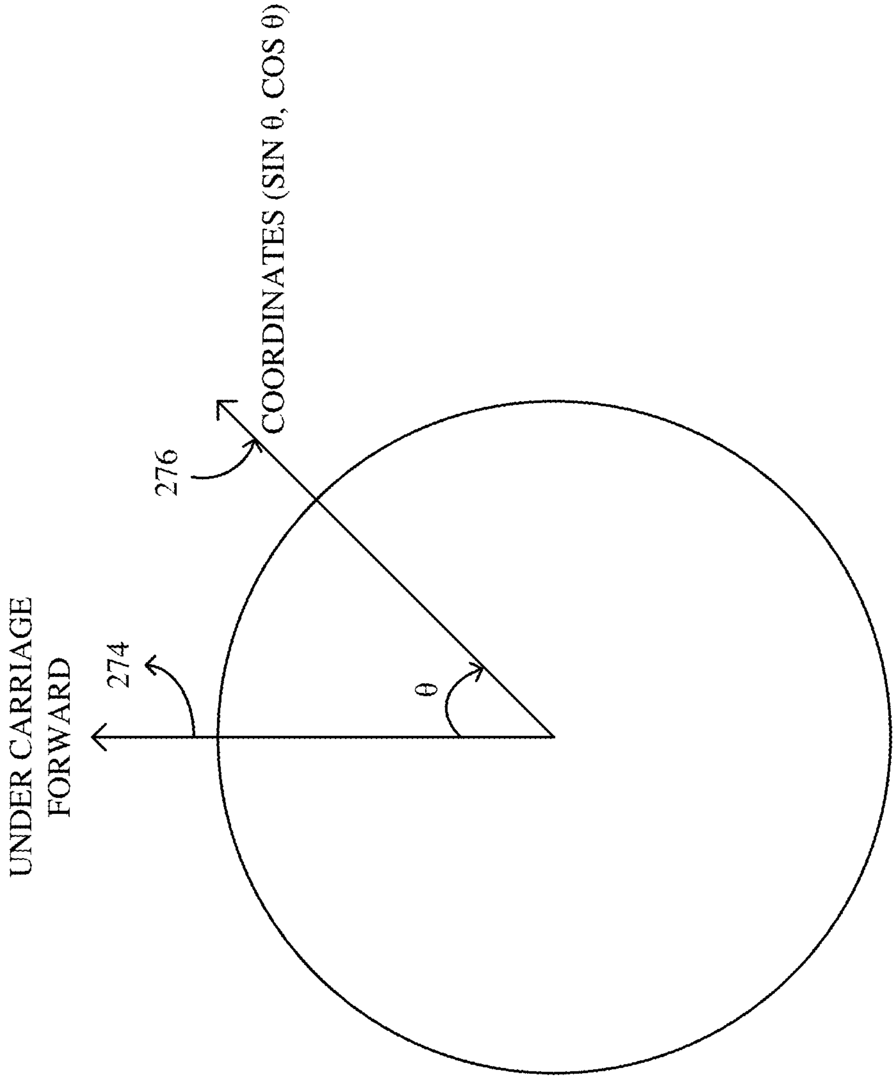
FIG. 13 shows one example of computing coordinates used to identify a dynamic display portion accounting for swing angle.

This means that the coordinates for the dynamic display portion can be calculated, relative to the swing angle, using the swing angle θ illustrated in FIG. 13. FIG. 13 shows that arrow 274 corresponds to a swing angle of 0° (e.g., the reference position) where the under carriage 110 is pointing straight forward and the house 106 is also pointed straight forward. Arrow 276 corresponds to a swing angle θ from the reference position, where the under carriage 110 is pointed straight forward, but the house 106 is rotated to coordinates (sin 0, cos 0). Once the x and y coordinates are obtained, they can be applied to the combined image 162 to identify the dynamic display portion based on swing angle.

When machine 102 is traveling over the ground, then a travel offset must be generated and applied to the coordinates generated based on the swing angle in order to obtain the correct dynamic display portion that should be displayed to operator 264. For instance, based upon the direction of travel, degrees may need to be added to or subtracted from the swing angle to obtain the correct coordinates.

Figure 14:
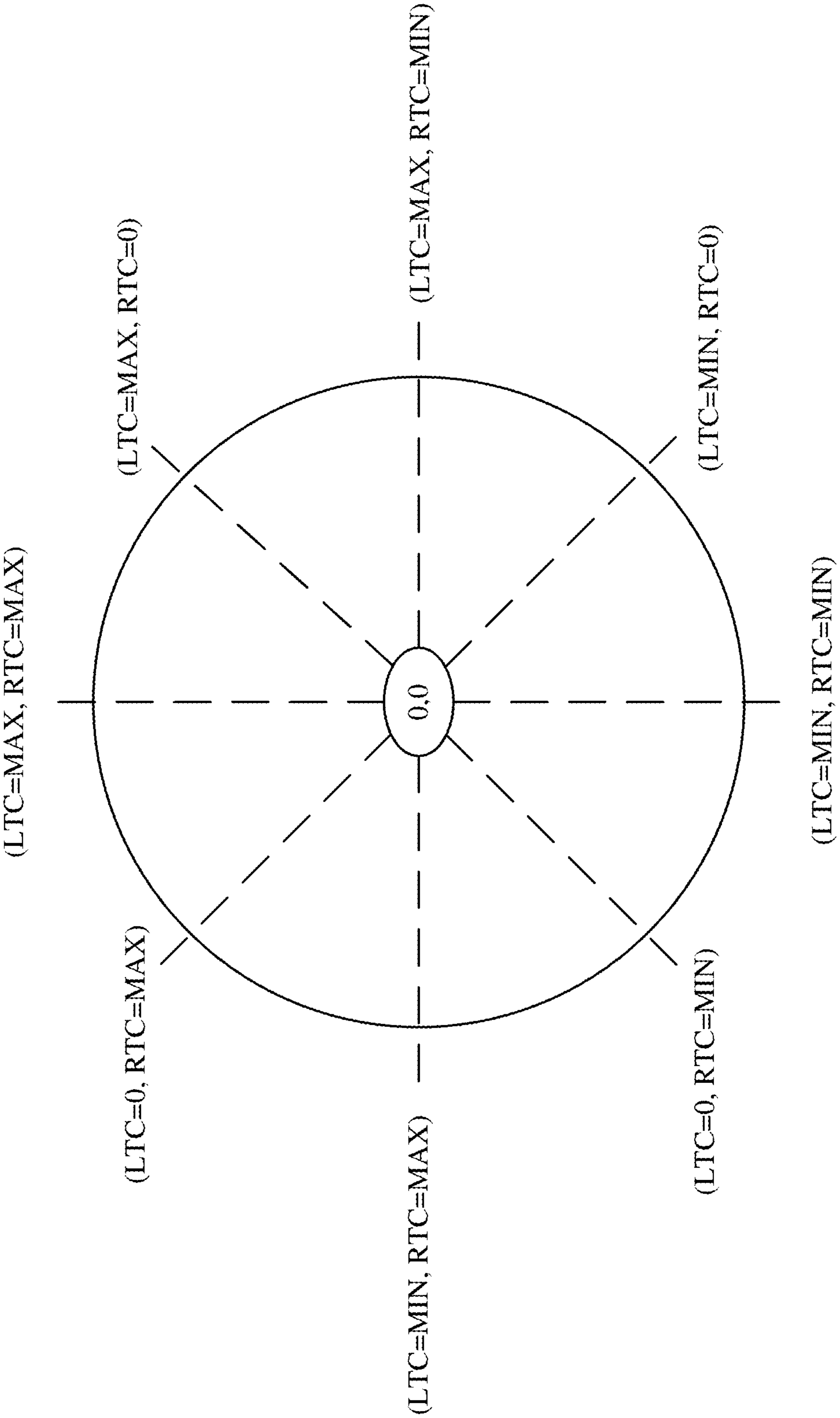
FIG. 14 shows one example of computing an offset to the coordinates based on a direction of travel.

It is assumed that the left and right tracks 136, 112 are controlled by track control signals which each have a value that ranges from −125 (full reverse) to 125 (full forward). Thus, as shown in FIG. 14, when the left track control (LTC) value is maximum and the right track control (RTC) value is also maximum, then this corresponds to motion in the forward direction. When LTC=0 and RTC=maximum, this corresponds to motion in the forward, left direction. When LTC is a minimum and RTC is a maximum, this corresponds to motion to the left, etc., as indicated by FIG. 14. Thus, in order to convert the LTC and RTC values from FIG. 14 into degrees which can be added to or subtracted from the coordinates described above with respect to FIG. 13, the degrees can be calculated as set out in Equation 1 below:

$$d = \frac{LTC - RTC}{\mathrm{Max}(|LTC|, |RTC|)} * 45;$$

where d=travel control offset, in degrees.

Further, if the sum of LTC and RTC is less than 0, then 180° is added to the value d.

Once the value d has been calculated as discussed above, that value can be subtracted from the swing angle (SA)

obtained as discussed above with respect to FIG. 13, before the value is converted to radians. In order to convert the value to radians, the value is divided by 180 and multiplied by pi as follows:

$$x = \sin\left(\frac{SA - d}{180}\pi\right)$$

$$y = \cos\left(\frac{SA - d}{180}\pi\right);$$

where SA=swing angle;

x, y are the x and y coordinates defining the dynamic display portion; and d is the offset in degrees corresponding to the travel direction as computed in Equation 1.

Figure 12:
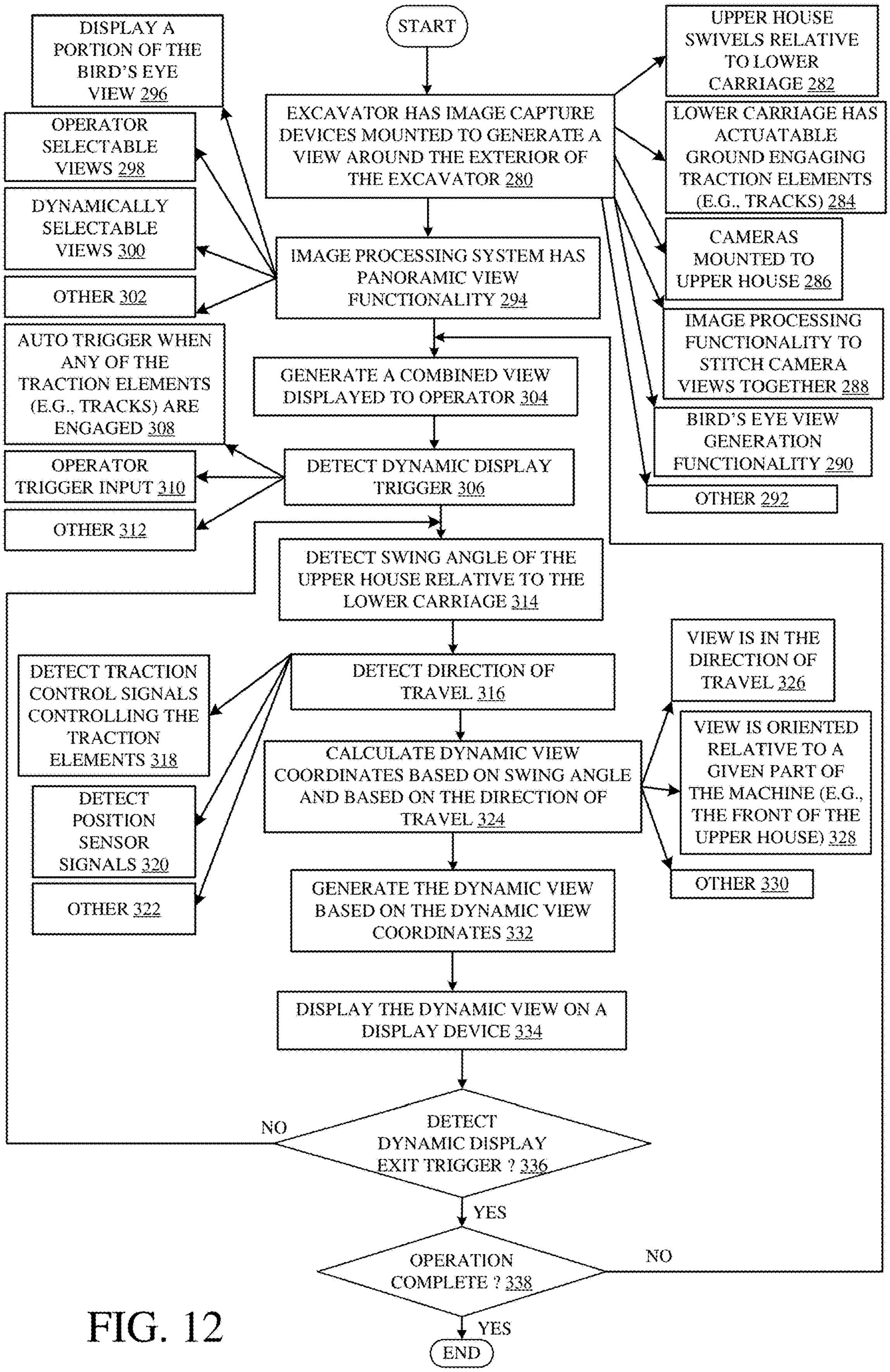
FIG. 12 is a flow diagram showing one example of the operation of the dynamic image processing system.

FIG. 12 is a flow diagram illustrating one example of the operation of the dynamic display generation system 208. Again, FIG. 12 will be described with respect to the work machine 102 being an excavator, although the description could be just as easily made with respect to the work machine 102 being another type of work machine that has a rotatable house that is rotatable relative to an under carriage that is coupled to the traction elements.

It is first assumed that excavator 102 has image capture devices (such as cameras 140, 142, 144, and 146) that capture images that can be used to generate a combined view around the exterior of the excavator 102, as indicated by block 280 in the flow diagram of FIG. 12. Also, it is assumed that the upper house 106 swivels relative to the under carriage 110, as indicated by block 282 and that the under carriage has actuatable ground-engaging traction elements, such as tracks 112, 136, as indicated by block 284 in the flow diagram of FIG. 12. It is also assumed that the image capture devices or cameras 140, 142, 144, and 146 are mounted to the house 106, as indicated by block 286 and that an image stitching system 210 has functionality to stitch the camera views together to obtain a meshed or combined view, as indicated by block 288. In one example, a bird's eye view generator 248 generates a bird's eye view from the stitched images, as indicated by block 290. Bird's eye view generator 248 can generate the bird's eye view using a transformation such as a homography matrix or another type of transformation. The excavator 102 can include a wide variety of other functionality as well, as indicated by block 292.

It is also assumed that the dynamic image processing system 160 has panoramic view functionality, such as dynamic display generation system 208, in which a portion of the combined view 162 can be identified and generated for display to an operator, as indicated by block 294. In one example, coordinates generated by the dynamic display generation system 208 can be provided to dynamic view selector 250 to select a portion of the bird's eye view that is to be displayed to the operator, as indicated by block 296.

In another example, the portion to be displayed to the operator can be operator selectable, as indicated by block 298. In one example, for operator selection, the overall combined view 162 shown in FIG. 6 can be displayed to operator 264. Operator 264 can then interact with that display to selectively display only a portion of the view in a desired direction. For instance, if the display is on a touch screen, then operator 264 may swipe to the right or to the left to preferentially view an area around house 106 on the right or the left, respectively. In another example, the operator 264 may swipe diagonally upward in which case dynamic image processing system 160 generates a display portion showing an area the forward right-hand side periphery of machine 102. These are examples and operator selectable views can be selected in other ways as well.

The operator 264 may wish to manually select or change the view for various reasons. For instance, assume that the work machine 102 is traveling in a given direction, but it is traveling parallel to, and closely proximate, a wall. It may be, in that case, that operator 264 may wish to see a view in the direction of the wall, instead of in the direction of travel, in order or avoid contact with the wall. This is just one example in which operator 264 may provide an input changing the dynamic display portion from displaying a view ahead of the work machine 102 in the direction of travel to displaying a different view.

In yet another example, the dynamic display portion is dynamically and automatically selectable, as indicated by block 300. By automatic it is meant, in one example, that the operation is performed without further human involvement except, perhaps, to authorize or initiate the operation. For instance, dynamic display generation trigger detector 224 can automatically detect a dynamic display trigger and the coordinates for the dynamically generated display can be generated and provided to image stitching system 210 which automatically generates the dynamic display portion based on the coordinates. The image processing system may have other functionality to select and display images in other ways as well, as indicated by block 302.

Bird's eye view generator 248 generates a combined view 162 which can be displayed to operator 264. Generating and displaying the combined view (such as view 162 shown in FIG. 6) is indicated by block 304 in the flow diagram of FIG. 12.

Dynamic display generation trigger detector 224 then detects a dynamic display trigger, as indicated by block 306. The dynamic display trigger may be an automated trigger which is detected when any of the traction elements (e.g., tracks) are engaged, as indicated by block 308. The dynamic display trigger may be detected based on an operator input as indicated by block 310, or based on another input that indicates that machine 102 is moving over the ground, as indicated by block 312.

Angle processing system 244 then detects the swing angle of the upper house 106 relative to the under carriage 110 with respect to the reference position. Detecting the swing angle is indicated by block 314 in the flow diagram of FIG. 12. Left and right track control processing system 234 detects the direction of travel, as indicated by block 316. The direction of travel can be detected by detecting the traction control signals controlling the traction elements, as indicated by block 318, or by detecting position signals from a position sensor 220, as indicated by block 320, or in other ways, as indicated by block 322.

View coordinate generator 244 then calculates the dynamic view coordinates 272 based on the swing angle and based on the direction of travel, as indicated by block 324 in the flow diagram of FIG. 12. The dynamic view coordinates correspond to or define a view that is in the direction of travel, as indicated by block 326 and a view that is oriented relative to a given part of machine 102 (e.g., relative to the front of the upper house 106), as indicated by 328. The dynamic view coordinates can be calculated in other ways as well, as indicated by block 330.

Dynamic view selector 250 then applies the view coordinates 272 to the combined view 162, or bird's eye view, generated by bird's eye view generator 248 to generate the dynamic view portion based upon the view coordinates, as indicated by block 332 in the flow diagram of FIG. 12. View output system 252 then outputs the dynamic view for display on display screen 256, as indicated by block 334 in the flow diagram of FIG. 12.

At some point, dynamic display generation trigger detector 224 may detect criteria indicating that the dynamic display mode should be exited, so that system 208 is no longer generating a dynamic display portion on display screen 256. For instance, it may be that machine 102 stops traveling along the ground or that an operator input indicates that the dynamic display mode should be exited, or other trigger criteria can be detected. Detecting a dynamic display exit trigger is indicated by block 336 in the flow diagram of FIG. 12.

If dynamic display generation system 208 has not detected criteria indicating that it should stop generating the dynamic display portion, the processing reverts to block 314 where the swing angle is detected and block 316 where the direction of travel is detected, etc. However, if criteria are detected indicating that dynamic display generation system 208 should no longer generate the dynamic display portion, then, as long as the current work operation is not complete, as indicated by block 338 in the flow diagram of FIG. 12, the processing reverts to block 304 where the combined view is generated and displayed to operator 264.

It can thus be seen that the present description describes a system that automatically detects when a work machine is traveling and generates a dynamically updated display portion that displays an area ahead of the machine in the direction of travel. The dynamically updated display portion accounts for changes in the direction of travel as well as for a swing angle by which an upper house 106 is rotated relative to an under carriage 110. Even though the swing angle changes to a new direction of travel, the dynamic display portion will continue to display an area ahead of the machine in the direction of travel, and consistently oriented with respect to a given portion of the house, such as with respect to the front of the house. As the direction of travel changes, the dynamically updated display portion will also change to show an area in front of the work machine in the new direction of travel. This greatly enhances the ability of an operator to accurately pilot a work machine, even though visibility may be difficult.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays the mechanisms has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, detectors, selectors, sensors, and/or logic. It will be appreciated that such systems, components, detectors, selectors, sensors, and/or logic can be comprised of hardware items (such as processors and associated memory, or other processing components, some of which are described below) that perform the functions associated with those systems, components, detectors, selectors, sensors, and/or logic. In addition, the systems, components, detectors, selectors, sensors, and/or logic can be comprised of software that is loaded into a memory and is subsequently executed by a processor or server, or other computing component, as described below. The systems, components, detectors, selectors, sensors, and/or logic can also be comprised of different combinations of hardware, software, firmware, etc., some examples of which are described below. These are only some examples of different structures that can be used to form the systems, components, detectors, selectors, sensors, and/or logic described above. Other structures can be used as well.

Figure 15:
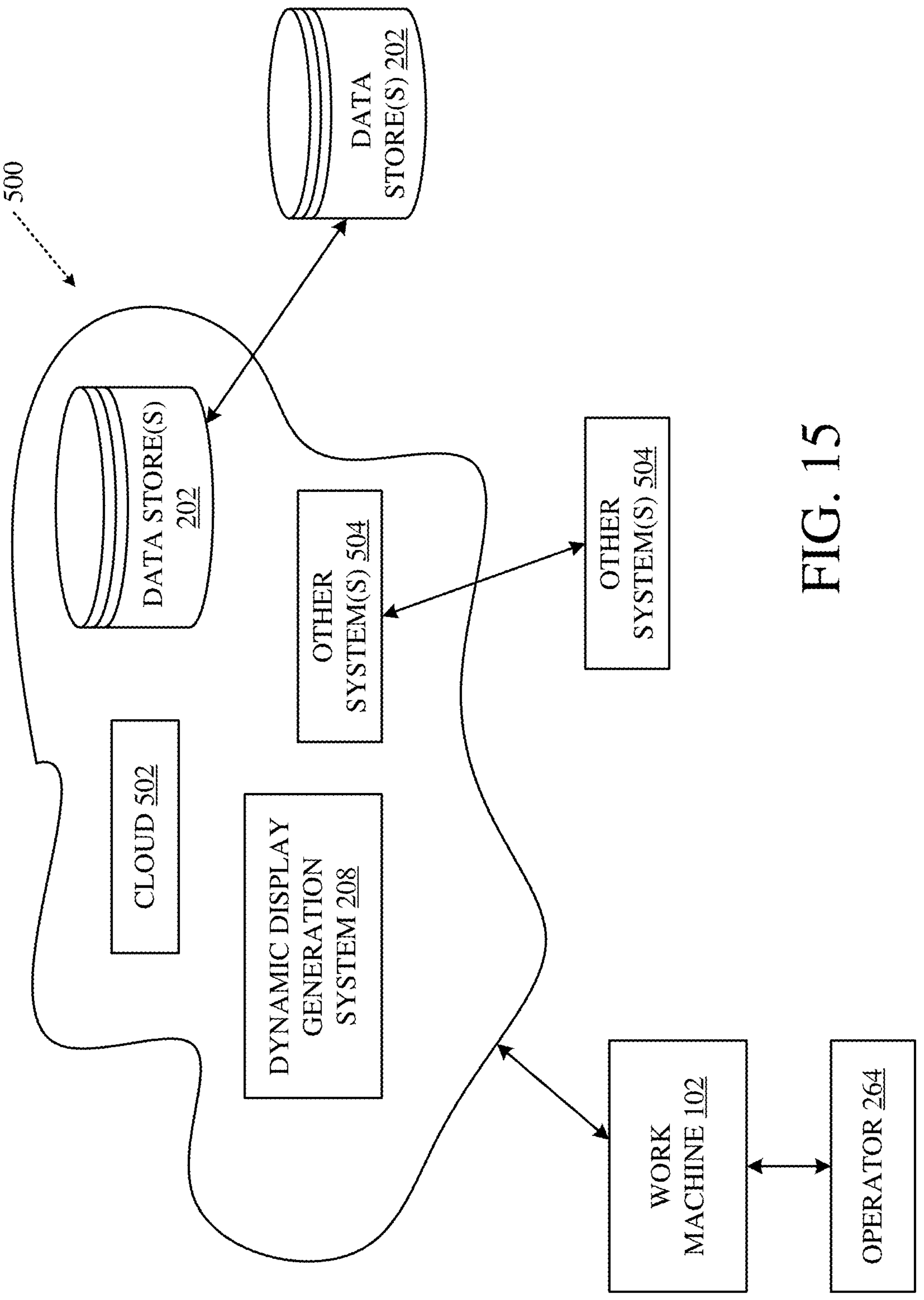
FIG. 15 is a block diagram showing one example of an image processing architecture, deployed in a remote server architecture (such as the cloud).

FIG. 15 is a block diagram of work machine 102, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 15, some items are similar to those shown in previous FIGS. and they are similarly numbered. FIG. 15 specifically shows that dynamic display generation system 208 and data store 202 can be located at a remote server location 502. Therefore, work machine 102 accesses those systems through remote server location 502.

FIG. 15 also depicts another example of a remote server architecture. FIG. 15 shows that it is also contemplated that some elements of previous FIGS. are disposed at remote server location 502 while others are not. By way of example, data store 202 or other systems 504 can be disposed at a location separate from location 502, and accessed through the remote server at location 502. Regardless of where the items are located, the items can be accessed directly by work machine 102, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 16:
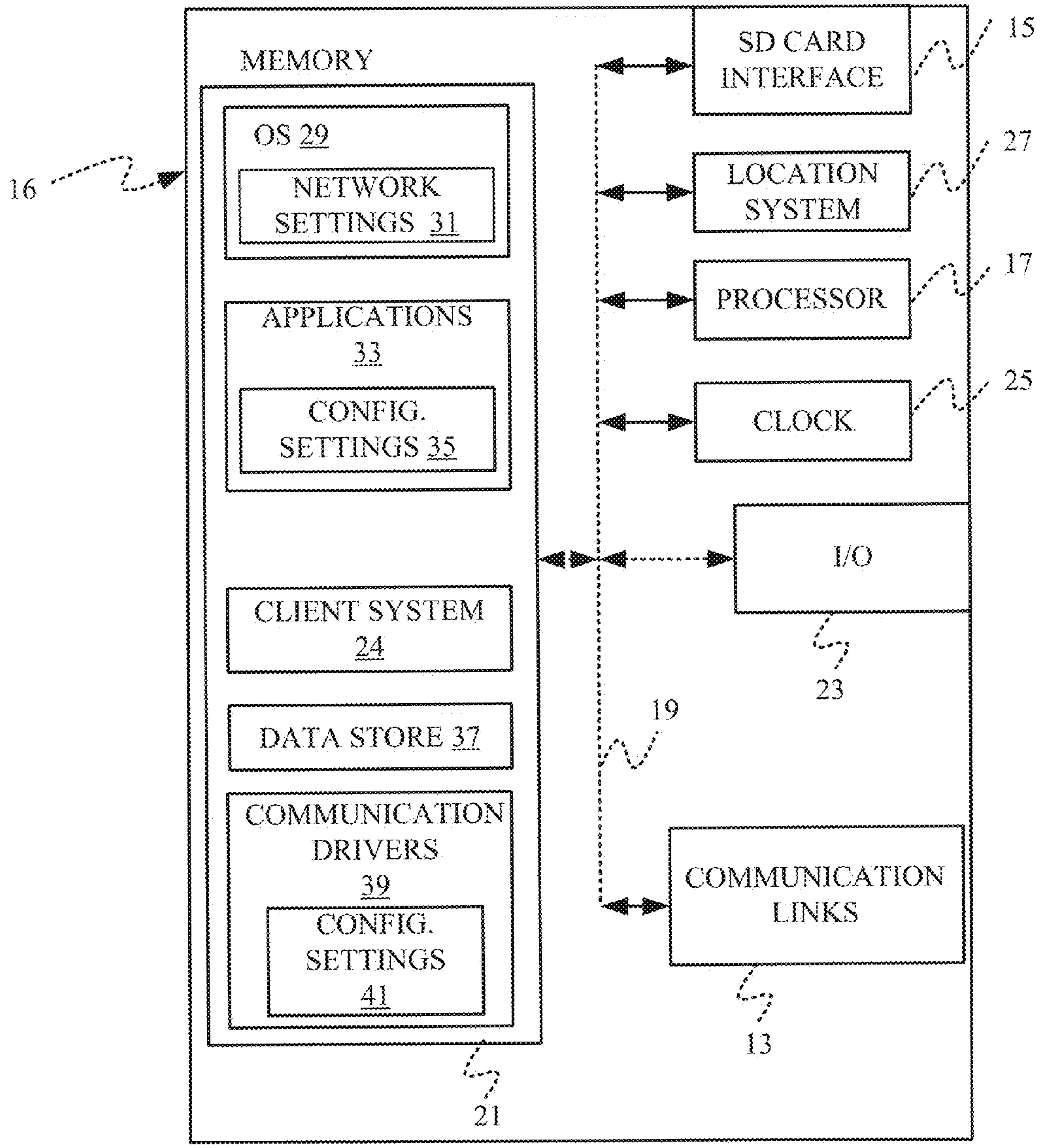
FIGS. 16, 17, and 18 show examples of mobile devices.
Figure 17:
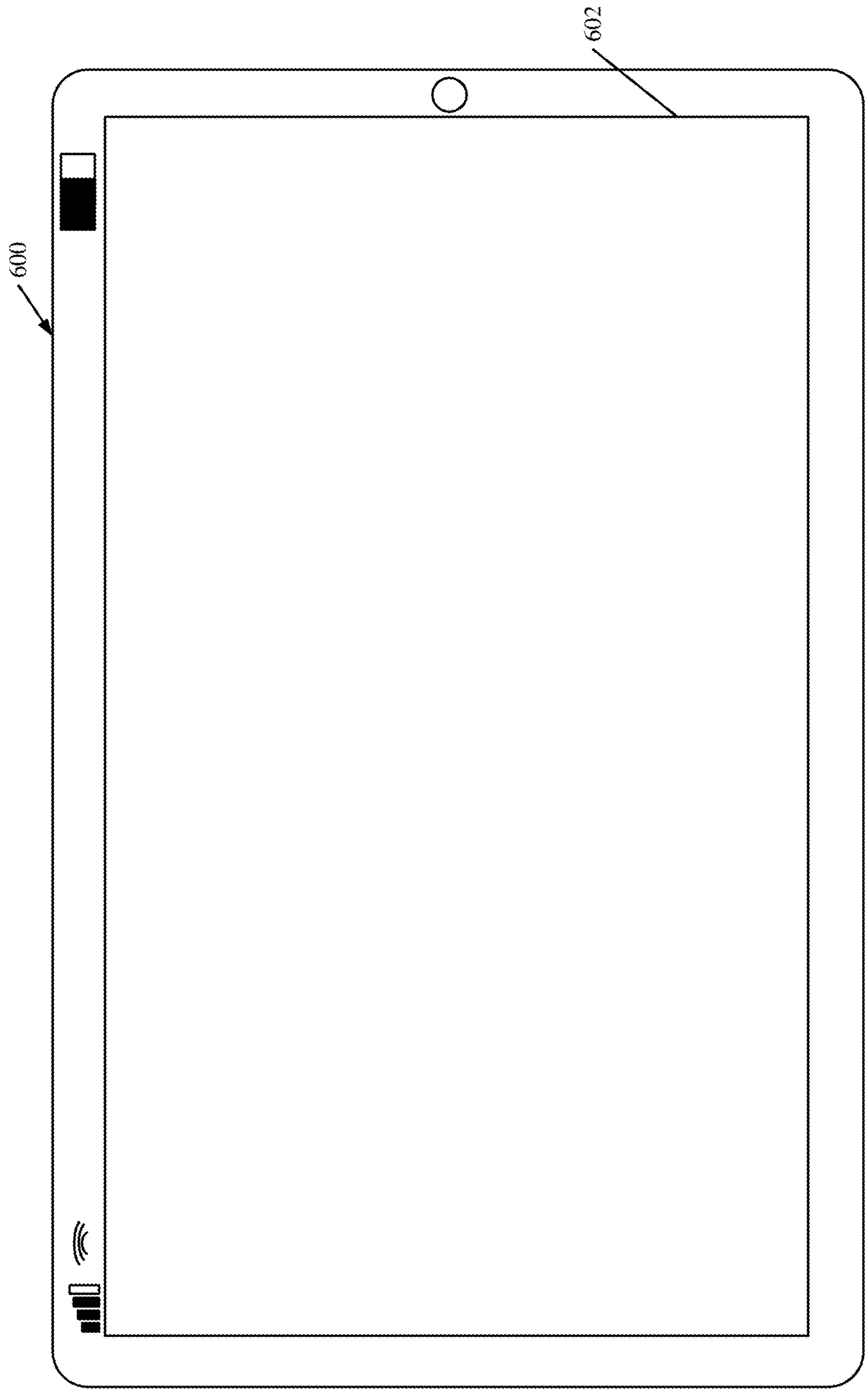
Figure 18:
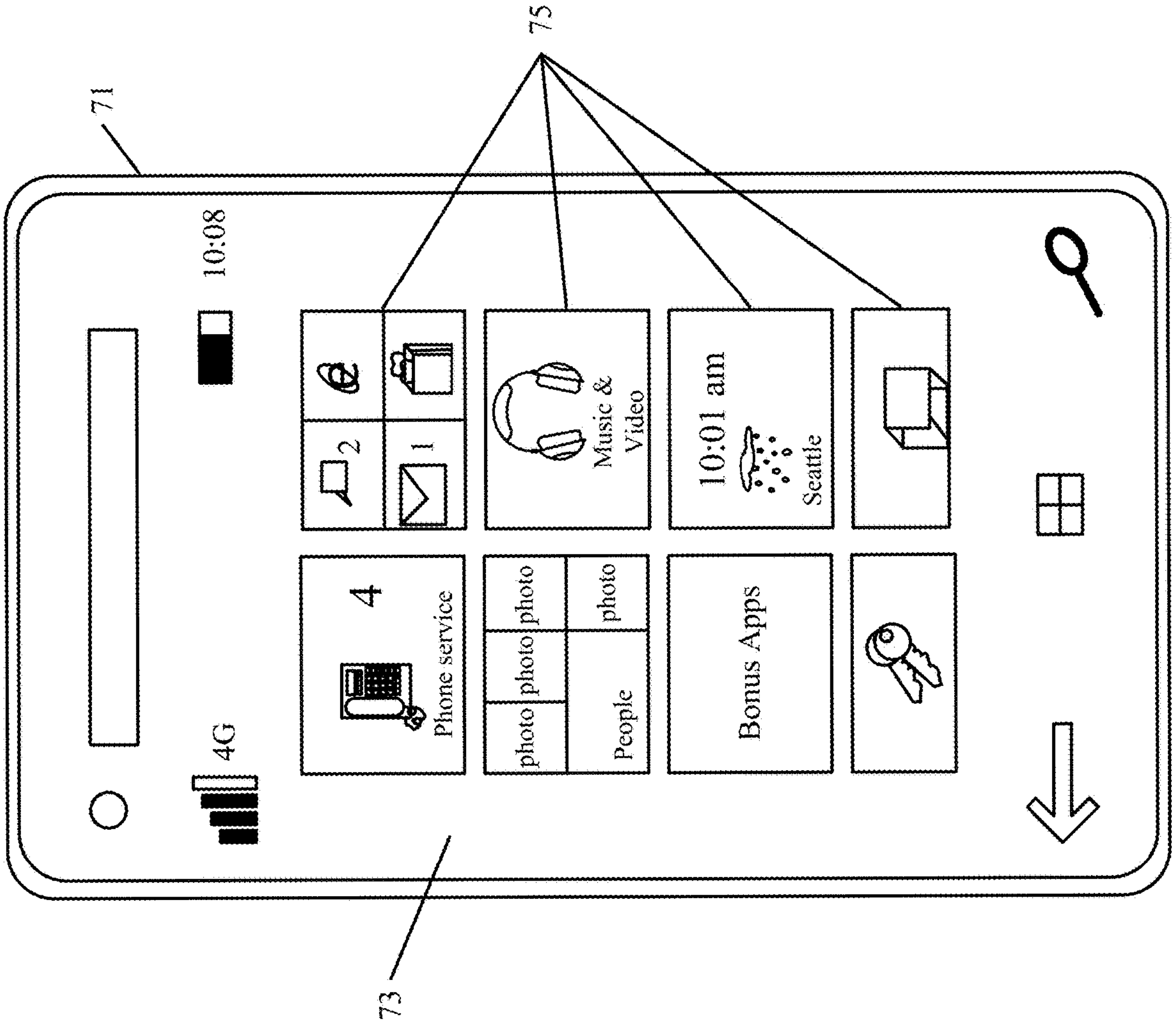

FIG. 16 is a simplified block diagram of one illustrative example of a handheld or mobile computing device that can be used as a user's or client's hand held device 16, in which the present system (or parts of it) can be deployed. For instance, a mobile device can be deployed in the operator compartment 104 of work machine 102 for use in generating, processing, or displaying the stool width and position data. FIGS. 17-18 are examples of handheld or mobile devices.

FIG. 16 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 17 shows one example in which device 16 is a tablet computer 600. In FIG. 17, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 18 shows that the device can be a smart phone 71. Smart phone 71 has a touch sensitive display 73 that displays icons or tiles or other user input mechanisms 75. Mechanisms can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 19:
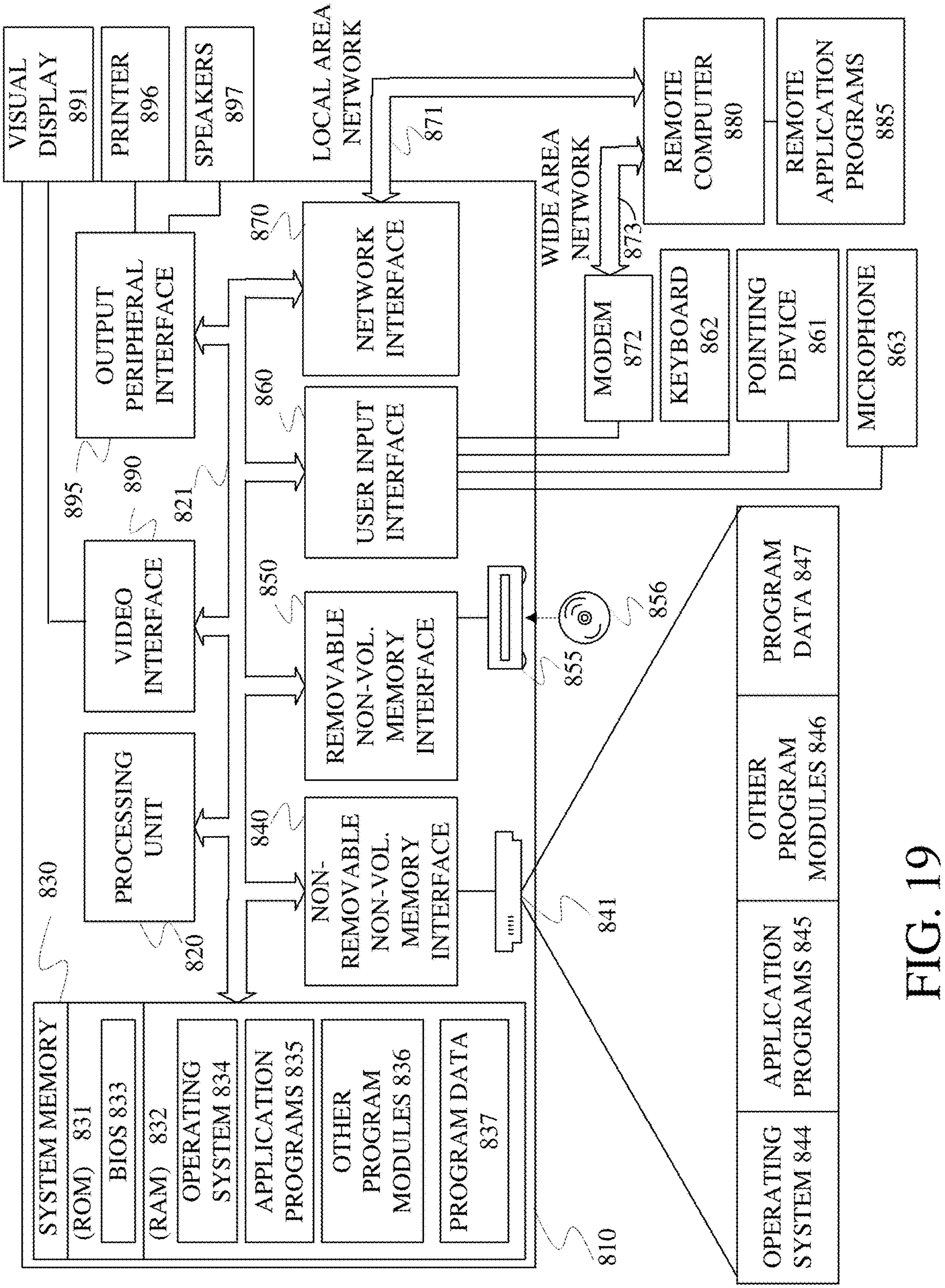
FIG. 19 is a block diagram showing one example of a computing environment that can be used in the systems and architectures illustrated in other figures.

FIG. 19 is one example of a computing environment in which elements of previous FIGS., or parts of it, (for example) can be deployed. With reference to FIG. 19, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 19.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 19 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 19 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
- detecting a swing angle indicative of an angle that an upper house of a work machine is rotated relative to a lower carriage of the work machine from a reference position;
- detecting a direction of travel of the work machine over a surface on which the work machine is traveling;
- generating a display of an area ahead of the work machine in the direction of travel based on the swing angle, wherein generating the display comprises:
  - receiving a plurality of overlapping images of areas about a periphery of the upper house;
  - combining the plurality of overlapping images to obtain a combined image showing an area around an entire periphery of the upper house; and
  - automatically selecting a display portion of the combined image preferentially showing the area along the periphery of the upper house in the direction of travel; and
- displaying the display on a display device in an operator compartment of the work machine.

2. The computer implemented method of claim 1 wherein generating the display portion comprises:
- orienting the display in the selected display portion in a predefined relationship relative to a predefined portion of the work machine.

3. The computer implemented method of claim 2 wherein combining the plurality of overlapping images comprises:
- generating a bird's eye view image based on the plurality of overlapping images.

4. The computer implemented method of claim 2 wherein orienting the display comprises:
- orienting the display in the selected display portion in a predefined relationship relative to a front of the upper house of the work machine.

5. The computer implemented method of claim 2 and further comprising:
- detecting a change in the swing angle; and
- dynamically updating the selected display portion of the combined image to show the area along the periphery of the upper house in the direction of travel.

6. The computer implemented method of claim 5 and further comprising:

detecting a change in the direction of travel; and dynamically updating the selected display portion of the combined image, based on the change in the direction of travel, to show the area along the periphery of the upper house in the direction of travel.

7. The computer implemented method of claim 1 and further comprising:

prior to displaying the display, detecting a dynamic display trigger.

8. The computer implemented method of claim 7 wherein detecting the dynamic display trigger comprises:

detecting movement of the work machine over the surface.

9. The computer implemented method of claim 1 wherein the work machine comprises a plurality of independently controllable traction elements and wherein detecting a direction of travel comprises:

detecting a direction and speed of travel of the plurality of independently controllable traction elements.

10. The computer implemented method of claim 9 wherein the plurality of independently controllable traction elements comprise first and second tracks controlled by first and second traction control signals and wherein detection a direction of travel comprises:

detecting the first and second traction control signals; and computing the direction of travel based on the first and second traction control signals.

11. A control system on a work machine, comprising:

a swing angle sensor configured to detect a swing angle indicative of an angle that an upper house of the work machine is rotated, from a reference position, relative to a lower carriage of the work machine;

a travel offset generation system configured to detect a direction of travel of the work machine over a surface on which the work machine is traveling;

a dynamic display generation system configured to generate a display of an area ahead of the work machine in the direction of travel based on the swing angle, wherein the dynamic display generation system comprises:

a plurality of image capture sensors capturing overlapping images of areas about a periphery of the upper house;

a combined view generator configured to combine the overlapping images to obtain a combined image showing an area around an entire periphery of the upper house; and a dynamic view selector configured to automatically select a display portion of the combined image, the selected display portion preferentially showing the area along the periphery of the upper house in the direction of travel; and a view output system configured to display the display on a display device in an operator compartment of the work machine.

12. The control system of claim 11 wherein the dynamic view selector is configured to orient the display in the selected display portion in a predefined relationship relative to a predefined portion of the work machine.

13. The control system of claim 12 wherein the swing angle sensor is configured to detect a change in the swing angle and wherein the dynamic view selector is configured to update the selected display portion of the combined image to show the area along the periphery of the upper house in the direction of travel and in the predefined relationship relative to the predefined portion of the work machine.

14. The control system of claim 13 wherein the travel offset generation system is configured to detect a change in the direction of travel and wherein the dynamic view selector is configured to dynamically update the selected display portion of the combined image, based on the change in the direction of travel, to show the area along the periphery of the upper house in the direction of travel.

15. The control system of claim 11 and further comprising:

a dynamic display generation trigger detector configured to, prior to the view output system displaying the display, detect a dynamic display trigger and generate a trigger signal, the view output system displaying the display in response to the trigger signal.

16. The control system of claim 15 wherein the dynamic display generation trigger detector is configured to detect, as the dynamic display trigger, movement of the work machine over the surface.

17. A work machine comprising:

an upper house;

a lower carriage;

at least one processor; and memory storing instructions executable by the at least one processor, wherein the instructions, when executed, cause the work machine to perform:

detecting a swing angle indicative of an angle that the upper house is rotated relative to the lower carriage from a reference position;

detecting a direction of travel of the work machine over a surface on which the work machine is traveling;

generating a display of an area ahead of the work machine in the direction of travel based on the swing angle, wherein generating the display comprises:

receiving a plurality of overlapping images of areas about a periphery of the upper house;

combining the plurality of overlapping images to obtain a combined image showing an area around an entire periphery of the upper house; and automatically selecting a display portion of the combined image preferentially showing the area along the periphery of the upper house in the direction of travel; and displaying the display on a display device in an operator compartment of the work machine.

18. The work machine of claim 17, wherein generating the display portion comprises:

orienting the display in the selected display portion in a predefined relationship relative to a predefined portion of the work machine.

19. The work machine of claim 18, wherein combining the plurality of overlapping images comprises:

generating a bird's eye view image based on the plurality of overlapping images.

20. The work machine of claim 19, wherein orienting the display comprises:

orienting the display in the selected display portion in a predefined relationship relative to a front of the upper house of the work machine.

* * * * *